Nov. 10, 1942.   C. I. BRADFORD   2,301,194
MEASURING INSTRUMENT
Filed Sept. 28, 1940   4 Sheets-Sheet 1

INVENTOR
COLIN IRVING BRADFORD
BY
ATTORNEYS

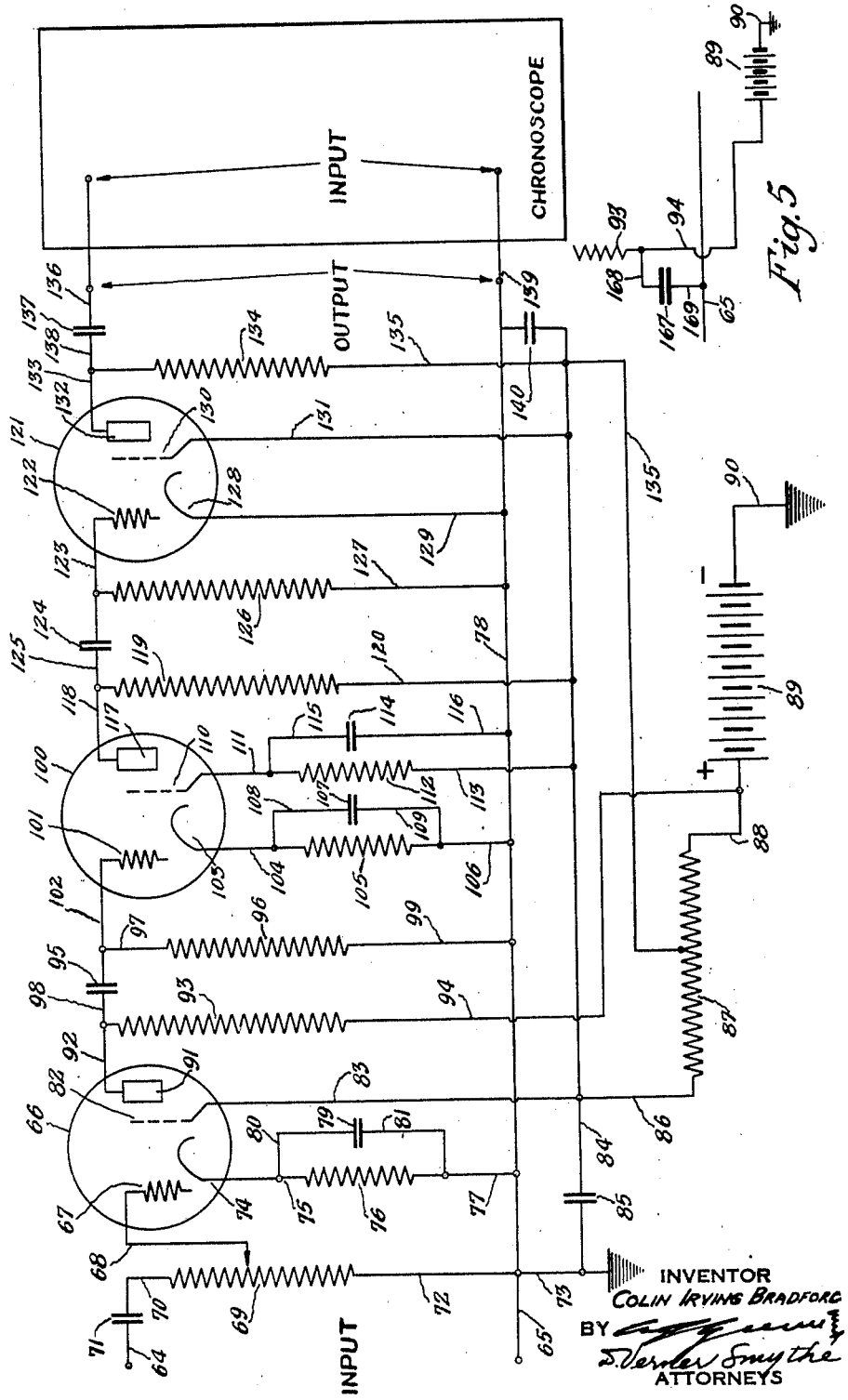

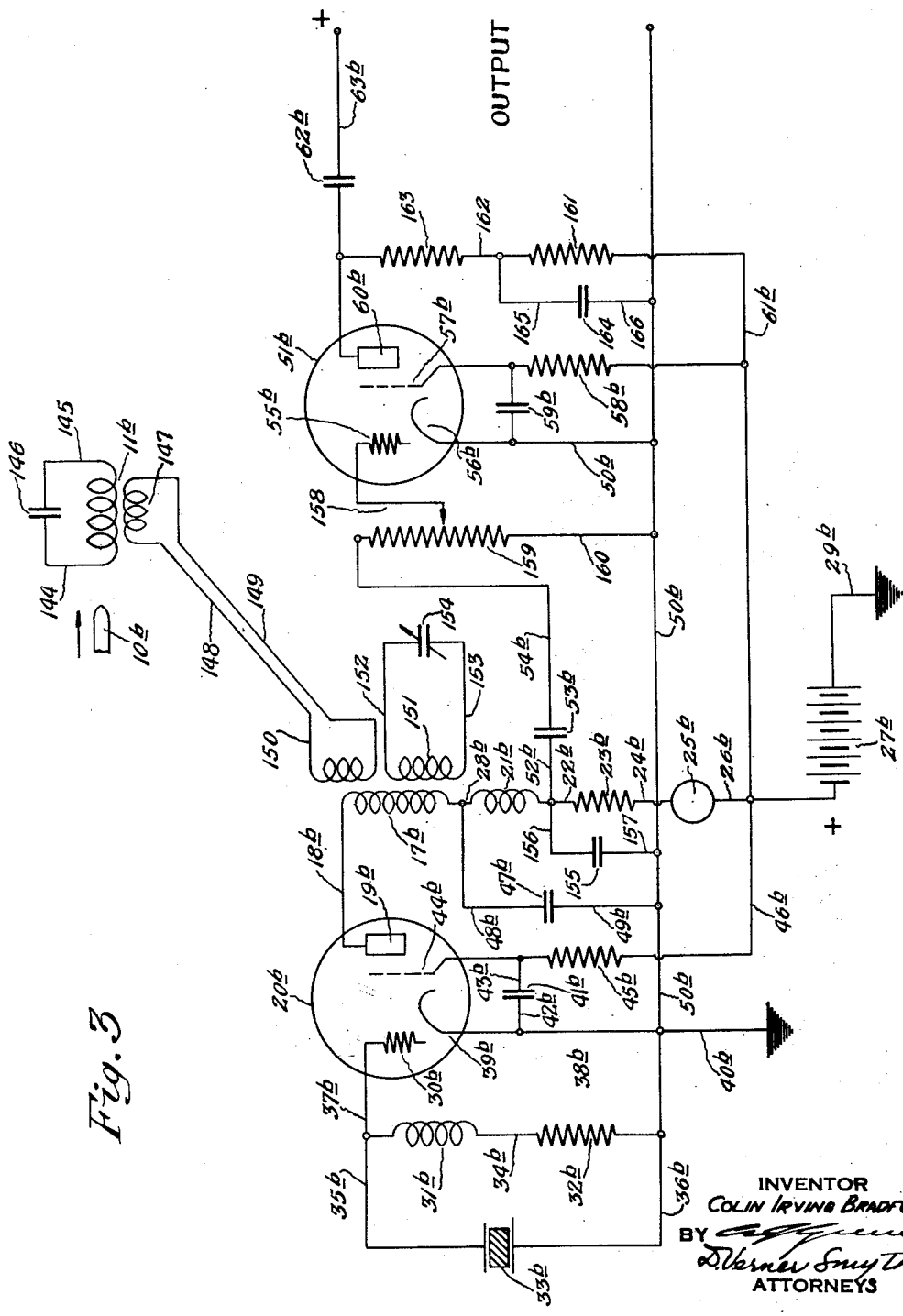

Nov. 10, 1942.   C. I. BRADFORD   2,301,194
MEASURING INSTRUMENT
Filed Sept. 28, 1940   4 Sheets-Sheet 4
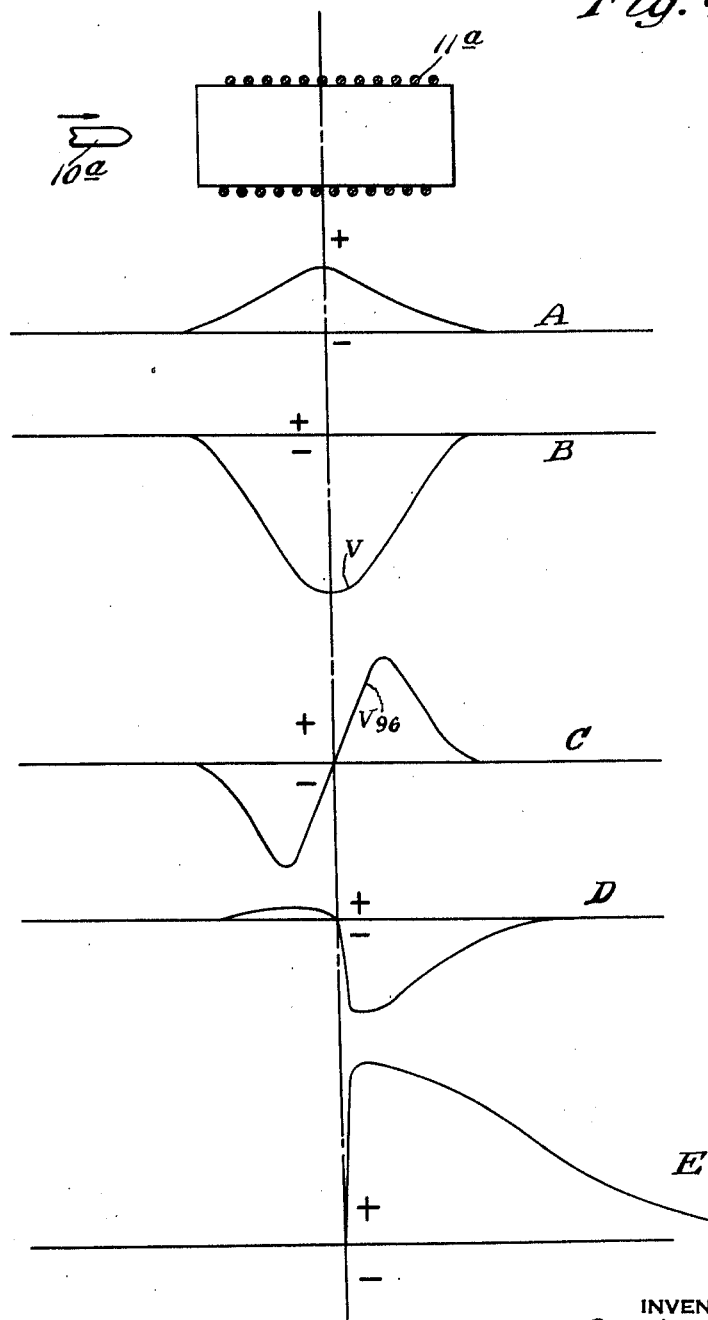

Patented Nov. 10, 1942

2,301,194

UNITED STATES PATENT OFFICE 2,301,194

MEASURING INSTRUMENT

Colin Irving Bradford, Stratford, Conn., assignor to Remington Arms Company, Inc., a corporation of Delaware Application September 28, 1940, Serial No. 358,805

12 Claims. (Cl. 234—1.5)

This invention relates to detecting the center and flight of objects, such as projectiles, at and past a given point, for the purposes of determining velocities, ascertaining the mass centers of objects, operating ballistic apparatus, etc. To facilitate an understanding of the present invention, its use is specifically described in connection with checking or testing the flight of a projectile.

Various methods have been employed in the past for detecting the passage of a projectile past a given point. Those methods which required physical contact of some member with the projectile during its flight often resulted in a retarded or altered flight of the latter, and have therefore proved disadvantageous for certain purposes. Methods making use of the sound wave at the nose of the projectile were not applicable for all velocities. Optical methods employing a light beam were not always satisfactory where small-sized projectiles were to be utilized. Solenoidal methods, requiring magnetization of the projectile, have proved to be useless for making measurements in connection with projectiles made of nonmagnetic metal.

The present invention overcomes the listed objections of the above methods and apparatus, in that it enables the flight of a projectile past a given point to be accurately detected, regardless of size, type of metal, or speed of the projectile, and also without materially retarding or altering the normal flight thereof.

According to the invention a magnetic disturbance caused by passage of a metallic projectile through a magnetic field is utilized to produce indicia in such a manner that the flight of the projectile past a given predetermined point in said field is instantly detected. It is not necessary that the projectile be statically charged, or magnetized, or otherwise previously prepared to enable these indicia to be produced, and the initial impulse caused by the passage of the projectile is of such character, and is utilized in such a manner that accurate indications may be obtained. Since the projectile is metallic, eddy currents set up in the metal when in the magnetic field produce magnetic effects which act upon the field, and upon the producing agent thereof, which in the present instance is a wire coil. This action is utilized in a particular manner to produce an indication when the projectile passes a given point in the coil.

Further, I have found that by producing the magnetic field in a particular manner, such as results for example from energization of a coil, or other means to create an electromagnetic field, the accuracy of the indicia is not affected, even if the projectile be slightly off its normal course. The projectile does not have to pass through the coil as it is merely necessary that the magnetic field be affected.

The embodiments of the invention shown herein utilize an energized coil, such as a solenoid, to produce a magnetic field through which the projectile passes, the arrangement being such that the magnetic disturbance caused by passage of the projectile results in a fluctuation of the solenoid current. This fluctuation is made to operate amplifying and conditioning apparatus so that an indicator such as a chronoscope will register at practically the same instant that the projectile is half way through the magnetic field of coil, or solenoid. It is to be understood that for indicia purposes a chronoscope or any other indicating device or medium may be used, such as, for example, an oscillograph or any instrument which will give a visual indication or make a record as the result of the fluctuation of the solenoid current. A chronoscope is an instrument giving an indication of an interval of time, and, as an object passes a first point, is started in operation or gives an indication thereof, and when the object passes a second point is stopped or gives a second indication. The time interval during the operating time of the chronoscope or between the two intervals may then be determined. The chronoscope referred to may be of the well-known Boulenge type or the Aberdeen chronograph referred to in the patent to Dunham et al., No. 2,146,723. In the case of the Boulenge chronograph, the passage of the body and the resultant fluctuation of solenoid current may be used to operate one of the electro-magnets thereof. In the Aberdeen chronograph, the output of applicant's device may be employed to cause a discharge of the condensers in said chronograph, thus generating a high tension current which punctures a recording strip in the usual manner.

A characteristic of the current fluctuation in the coil circuit caused by the passage of the projectile through the electromagnetic field of the coil or the like is that the rate of change of said fluctuation is a minimum at the exact instant the projectile is at a point half way through the field. I have found it to be most desirable to establish this point as a reference, and to utilize the characteristics of the current corresponding to this point to produce indicia.

Referring to the accompany drawings showing embodiments of the invention:

Fig. 2 illustrates diagrammatically another part of the device, to be used with the part of Fig. 1, and comprises voltage amplifying and differentiating circuits. I term this the "differentiating trip circuit." It is shown connected to a chronoscope.

Fig. 3 shows a modified coil disjunctor which may be used with the differentiating trip circuit of Fig. 2.

Fig. 4 shows graphically the voltage curves relating to various parts of the circuits.

Fig. 5 is a diagrammatic view of a portion of Fig. 2 showing a modification.

Figure 1:
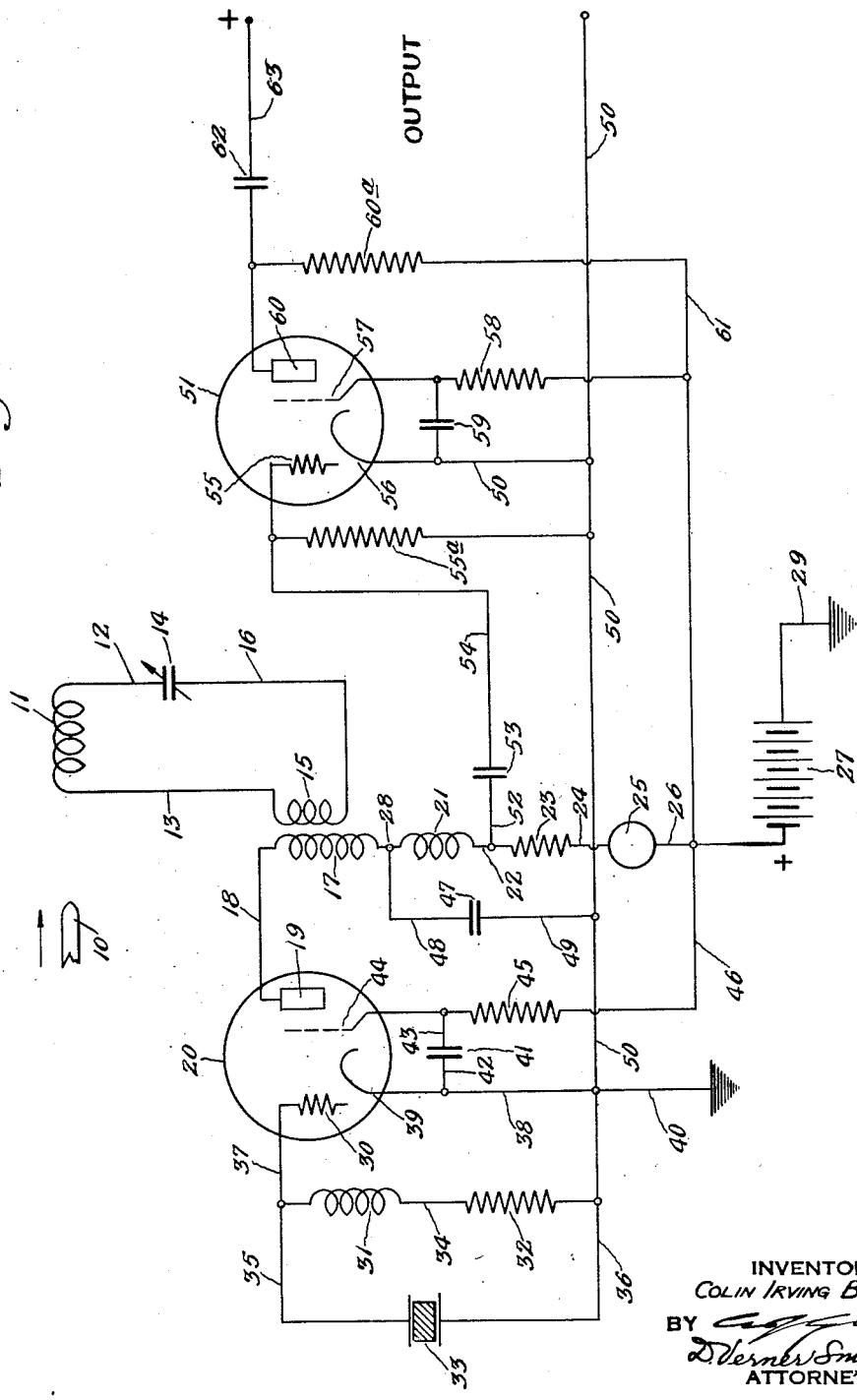
Figure 1 is a diagrammatic view of part of the device, showing the pickup solenoid, oscillator, and initial amplifier. This part I shall designate as the "coil disjunctor."

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation. The term "coil disjunctor" as used herein refers generally to any arrangement for disrupting or changing the normal and free flow of energy in the circuit.

As shown in Fig. 1, a projectile 10 is directed so that in flight it passes axially through a solenoid 11 connected by leads 12 and 13 to a variable condenser 14 and coil 15 respectively. The remaining ends of the condenser and coil are connected together by a lead 16 to complete a circuit for the solenoid. The projectile also may effectively be directed to pass through the magnetic field adjacent the coil, or not necessarily axially therethrough.

In order to excite this circuit, the coil 15 is inductively coupled to a coil 17 having one end connected by a lead 18 to the plate 19 of a radio frequency oscillator tube 20. The plate circuit of the tube 20 also includes an induction coil 21 connected by a lead 22 to a resistor 23, which is in turn joined by a lead 24 to a milliammeter 25 connected by a lead 26 to the positive post of a plate voltage supply 27, which latter may have a value of approximately 400 volts, although this depends on the tubes, circuit constants, etc. The coils 21 and 17 are joined by a lead 28, and the negative side of the voltage supply 27 is grounded at 29. The meter 25 is for the purpose of indicating the plate circuit current, as will be brought out later.

The frequency of the oscillator tube 20 is determined by impulses controlling the grid 30 thereof through connection with a crystal oscillating circuit including an inductance 31, resistor 32, and crystal 33. The inductance 31 is connected by a lead 34 to the resistor 32, and the remaining ends of inductance and resistor are joined through leads 35 and 36 respectively to the crystal 33. The grid 30 of the tube is connected by a lead 37 to the lead 35, and the lead 36 is connected by a lead 38 to the cathode 39 of the tube. The cathode 39, which is grounded by lead 40, is energized in the usual manner, which is not shown. The tube 20 is pictured as being of the screen grid type, although a three-element or other multiple element type may be satisfactorily used in its place with suitable circuit changes. As shown, a condenser 41 is connected by leads 42 and 43 to the cathode 39 and screen grid 44 respectively of the tube. A resistor 45 is connected to the screen grid 44, and by a lead 46 to the positive lead 26 of the plate supply 27. A radio frequency bypass condenser 47 of such size that it does not bypass the desired impulse generated across resistance 23 is connected by leads 48 and 49 to lead 28 and to ground 50 respectively. This completes the oscillator for exciting the solenoid circuit.

It should be understood that the crystal 33 may have any suitable type of oscillator substituted therefor, and the invention is not to be limited to the particular type shown herein.

It will be seen that the tube 20 and circuit as just described will oscillate according to a frequency determined by the crystal 33. In practice the circuit connected to the solenoid is tuned by the variable condenser 14 to one side of resonance, indication of which may be had from the milliammeter 25. There is thus a high frequency magnetic field created about the solenoid 11, and as the projectile 10 passes through this field eddy currents will be set up in the projectile, and these will act to reduce the effective inductance of the solenoid, causing a fluctuation in the normal oscillating current passing therethrough. Due to the coupling between the coils 15 and 17, this fluctuation will be transmitted to the plate circuit of the tube 20, and the adjustment of the condenser 14 is preferably made such that the plate current will increase as a result of the effect of the projectile's passage through the solenoid.

The effect of the projectile or other object upon the plate current of the oscillating circuit will be a maximum at the time that the projectile is exactly half way through the magnetic field of the solenoid. Before it reaches this point, the plate current in the circuit will be increasing, and as it leaves this point the current will decrease. The rate of change of the plate current will also be a minimum at the time of its maximum value, which is when the projectile is midway of the magnetic field, for example midway between the ends of the coil.

According to the invention this fluctuation in plate current is amplified and utilized to operate what is herein preferably referred to as a differentiating trip circuit, hereinafter described in detail, in such a manner that indicia can be obtained at the instant the plate current is a maximum, or its rate of change a minimum, corresponding to the position of the projectile midway of the magnetic field of the solenoid. It is to be understood, however, that the fluctuation in plate current may be utilized to directly operate a chronoscope or other indicating instrument.

Referring again to Fig. 1, the plate current fluctuation is strengthened by an amplifier circuit centering about the vacuum tube 51. This circuit is of the conventional type except that it is operated to be particularly responsive to negative pulses, and to be of low sensitivity for positive pulses. As the plate current increases, the lead 22 will become more negative. This lead is connected through a lead 52 to a condenser 53 which is in turn connected by lead 54 to the grid 55 of the tube 51, and therefore negative pulses will be impressed on the grid of the tube 51 due to increases in the plate current of the tube 20.

In the conventional manner, the tube 51 has a cathode 56 connected to the ground 50, screen grid 57 connected through a resistor 58 to the positive lead 26 of the plate supply 27, and through a condenser 59 to the cathode 56. The latter is energized in the usual manner, not shown. The plate 60 of the tube is energized by connection through a resistor 60a and lead 61 to the positive lead 26 of the plate supply 27. A grid resistor 55a connects between the lead 54 and the ground 50. The output of the tube is taken from the plate 60 through a condenser 62 to a lead 63, and from the ground 50.

Referring to Fig. 4, curve A is a graphic depiction of the output voltage obtainable between the lead 63 and the ground 50, this curve being shown in relation to the solenoid 11a. The projectile 10a is pictured about to enter the solenoid. Just before its entry the voltage begins to rise, when the projectile is at the mid point, the voltage is a maximum, and as it leaves the voltage drops in the manner shown. It will be noted that the maximum value, or minimum rate of change, takes place when the projectile is at the center of the solenoid.

The output terminals 63 and 50 of the circuit of Fig. 1 may be connected respectively to the input terminals 64 and 65 of the differentiating trip circuit shown in Fig. 2. Thus the voltage A, Fig. 4, is impressed on the first amplifier tube 66. This tube has a grid 67 connected by a lead 68 to a variable contact on a resistor 69. One end of the resistor 69 is connected by a lead 70 to a grid condenser 71 which is in turn connected to the input terminal 64. The other end of the resistor 69 is connected by a lead 72 to the input terminal 65, which is grounded by lead 73. The cathode 74 of the tube is energized in the usual manner, not shown, and is connected by a lead 75 through a resistor 76 and lead 77 to the ground 78 coming from the input terminal 65. A condenser 79 is connected across the resistor 76 by leads 80 and 81. The screen grid 82 of the tube is connected by a lead 83 which is thereby connected through a condenser 85 to the ground lead 73. Lead 84 is connected by a lead 86 to a resistor 87 which in turn is connected by a lead 88 to the positive side of a plate supply battery 89, the negative side of which is grounded through a lead 90. The supply battery may have a voltage of approximately 300, the precise voltage depending on the tubes used, etc. The plate 91 of the tube 66 is connected through a lead 92 to a resistor 93 which in turn is connected by a lead 94 to the positive lead 88 of the plate supply 89.

As an optional addition to the circuit a condenser 167 may be connected by leads 168 and 169 to the lead 94 and ground 78 respectively as shown in Fig. 5. This condenser is for the purpose of causing substantially all of the signal to appear across the resistance 93. The condenser is not entirely necessary when a battery 89 is used for the source of power but is desirable if a power pack is employed.

The tube 66 functions as an amplifier, and merely amplifies the pulse of voltage shown at A, Fig. 4, and simultaneously reverses its phase or polarity. The output of the tube 66, taken from the leads 92 and 78 has a voltage V as shown at B, Fig. 4. This voltage could be used in connection with a chronoscope to trip the latter, although it would require different adjustments of the chronoscope for large and small projectiles, since the size of the projectile affects the value of the voltage. Also, the position of the projectile in the electromagnetic field, of the solenoid or the like, corresponding to the voltage value at which the chronoscope trips would vary. I prefer to have the chronoscope trip in all cases when the projectile is midway of the electromagnetic field or midway between the ends of the solenoid, at which time the voltage V has a maximum value, or has a minimum rate of change. I accomplish this by an apparatus which produces from the voltage V the derivative of this voltage. Since the derivative of the curve at B, Fig. 4, is negative when V is decreasing (increasing negatively), zero when V is a minimum (maximum negative), and positive when V is increasing (decreasing negatively), I produce from the single surge V a single alternating pulse as shown at C, Fig. 4, which latter is negative as V decreases (increases negatively), zero as V reaches a minimum (maximum negative), and positive as V increases (decreases negatively). This is accomplished as follows: The voltage V is impressed across the outer ends of a series connected condenser 95 and resistor 96, these being joined by a lead 97, and the condenser being connected by a lead 98 to the plate lead 92, and the resistor by a lead 99 to the ground 78.

The reactance of the condenser 95 at the fundamental frequency of the voltage V is so very much higher than the resistance of the resistor 96 that a large percentage (e. g., 90%) of the voltage V appears across the condenser. Since current $$I = \frac{dQ}{dt}$$

and $Q = CV$, where $C$ = capacity of condenser, the current I which flows through the condenser 95 (and through the resistor 96) will be:

$$I = C\frac{dV}{dt}$$

and the voltage $V_{96}$ across the resistor 96 will be:

$$V_{96} = IR_{96} = CR_{96}\frac{dV}{dt}$$

where $R_{96}$ is the resistance of the resistor 96. Thus the voltage $V_{96}$ which appears across the resistor 96 is the derivative of the voltage V shown at B in Fig. 4, and is alternating in form as shown at C, Fig. 4. This voltage $V_{96}$ passes through zero at the instant that the voltage V is a maximum negative, or has a minimum rate of change. Thus from the unidirectional pulse originating in the plate circuit of the tube 20 of Fig. 1 there has resulted an alternating pulse or current through the resistor 96 of Fig. 2.

The voltage $V_{96}$ is now amplified and modified in form by means of the vacuum tube 100 and associated amplifier circuit, see Fig. 2. This amplifier is of conventional design except that it will respond most readily to positive pulses, and is very insensitive to negative pulses. For the purpose of impressing the voltage $V_{96}$ on the tube 100, the grid 101 thereof is connected by a lead 102 to the lead 97 from the resistor 96, and the cathode 103 is connected by a lead 104, resistor 105 and lead 106 to the ground 78. The resistor 105 is bridged by a condenser 107 through the medium of leads 108 and 109, and the cathode 103 is energized in the usual manner, not shown. A screen grid 110 is energized through a lead 111, resistor 112, and lead 113 connected to the positive lead 84, and a condenser 114 is connected by leads 115 and 116 to lead 111 and ground 78 respectively.

The plate 117 of the tube 100 is energized through a lead 118, resistor 119 and lead 120 which latter connects to the lead 84.

Due to the sensitivity characteristics of the tube 100 and amplifier circuit associated there-with, the voltage output from the tube, taken from the plate lead 118 and ground 78, is of the form shown at D, Fig. 4, in response to an input of the type shown at C of Fig. 4. It will be noted that only a very small positive loop is evident in response to the negative loop of $V_{96}$, whereas a large negative loop results from the positive loop of the voltage $V_{96}$. Also, it will be seen that the voltages shown at C and D are simultaneously timed but of opposite direction, and that both pass through zero simultaneously. It is evident that the rate of change of the negative loop of the voltage at D is much greater than the positive loop at C.

The alternating voltage as shown at D is impressed on an additional amplifier tube 121, which with its associated circuit is of the conventional type except that it is made highly responsive to negative pulses and insensitive to positive pulses. As shown, the grid 122 of the tube 121 is connected by a lead 123 to a condenser 124 which is in turn connected by lead 125 to the plate lead 118. A grid resistor 126 connects to the lead 123, and by a lead 127 to the ground 78. The cathode 128, which is energized in the usual manner, not shown, also connects by a lead 129 to the ground 78. The screen grid 130 is energized through a lead 131 connecting to the positive lead 84, and the plate 132 is energized by a lead 133, resistor 134, and lead 135 going to a tap on the resistor 87. An output terminal 136 is connected through a condenser 137 and lead 138 to the plate lead 133, and another output terminal 139 is connected to the ground 78. A condenser 140 is connected to the leads 78 and 135 respectively.

Output voltage resulting from an input to the tube 121 of a voltage such as at D, Fig. 4, is of the form shown at E, Fig. 4, and is wholly positive, beginning at the instant the voltage at D passes through zero, rising sharply in value to a maximum, and tapering off gradually. Thus there is no output voltage between the terminals 136 and 139 until the projectile reaches the midway point in the magnetic field or in the solenoid and the disjunctor output voltage (A, Fig. 4) reaches a maximum. A chronoscope connected to the terminals 136 and 139 will therefore trip when the projectile 10 reaches the midway point in the solenoid. As previously indicated, other indicia apparatus or mechanisms may be used, such as an oscillograph or other instrument responsive to a pulse. It will be noted that when the projectile 10 reaches the midway point the output of the differentiating trip circuit from the terminals 136 and 139 rises sharply, and it has a very high positive value compared with any value at which the chronoscope will trip. As a result, the chronoscope will trip at the proper instant regardless of the weight or velocity of the projectile and regardless of any deviations of the projectile from its normal course providing it still passes the field of the solenoid.

I have found that, by using a cut-away solenoid and checking by tripping the speed-light instead of the chronoscope, visual observation of the projectiles indicated that the device of the present invention was tripping within plus or minus .01 foot. At 1000 feet per second this represents a variation of ten millionths of a second which permits an accuracy of two tenths of a percent in velocity measurements over five feet.

Moreover, the likelihood of the projectile being retarded or altered in its flight is extremely nil, since there are no physical parts in its path, and since the force resulting from the eddy currents induced in the projectile is so slight as to be considered nonexistent.

The present invention, therefore, provides a method and apparatus for determining the velocity of projectiles with great accuracy and uniformity, regardless of size, type of metal, speed, and without materially retarding or altering the normal flight thereof.

It should be understood that the differentiating trip circuit and apparatus shown in Fig. 2 could be used equally well with any other type of disjunctor giving a positive voltage of the form shown at A in Fig. 4. For instance, the voltage obtained from the antennae in the electrostatic method described in Patent 2,146,723 issued to Dunham and Rechel could be fed into the differentiating trip circuit and thereby make the chronoscope or chronograph trip when the projectile is exactly opposite the antenna.

Although the present invention employs vacuum tubes of the screen grid type, it is evident that the usual three-element tubes may be successfully used, or tubes having a plurality of grids in excess of two.

Fig. 3 shows a modified disjunctor circuit which enables the solenoid to be located at a substantial distance from the location of the oscillator unit itself. Fig. 3 is similar in many respects to Fig. 1 and therefore like parts are given the same numerical designations in both figures, but the designations in Fig. 3 have the letter b added, to distinguish between the two circuits. Since the circuits are so nearly similar, and that of Fig. 1 has already been minutely described, only the new portions of Fig. 3 will be explained.

Referring to Fig. 3, the projectile $10b$ is shown about to pass through the solenoid $11b$ which now has its ends connected by leads 144 and 145 to a condenser 146. The solenoid $11b$ and condenser 146 form a complete circuit which responds to a frequency determined by the constants of the circuit. Inductively coupled to the solenoid $11b$ is a coil 147 which is connected through a cord of substantial length comprising a pair of leads 148 and 149 to a coil 150 which is in turn inductively coupled to the coil $17b$ in the plate circuit of the tube $20b$. Thus the unit comprising the solenoid $11b$, condenser 146, and coil 147 may be located at a distance from the unit which houses the rest of the circuit.

For the purpose of tuning the plate circuit of the tube $20b$ a coil 151 is placed in inductive relationship with the coils $17b$ and 150, and the ends of the coil 151 are connected by leads 152 and 153 to a variable condenser 154. I prefer to tune the plate circuit of the tube $20b$ by means of the condenser 154 to a point just one side of resonance, so that passage of the projectile $10b$ through the solenoid $11b$ will result in an increase in the current flowing in the plate circuit.

Referring again to the figure, a condenser 155 is connected by leads 156 and 157 to the leads $22b$ and $50b$ respectively. The grid $55b$ of the tube $51b$ is connected by a lead 158 to a variable tap on a grid resistor 159 one end of which is connected to the lead $54b$, and the other end through a lead 160 to the ground $50b$.

Plate energization of the tube $51b$ is effected from the lead $61b$ through a resistor 161, lead 162, and resistor 163 which latter is connected to the plate $60b$. A condenser 164 is connected by leads 165 and 166 to the lead 162 and the ground $50b$ respectively. Output is taken from the terminals $63b$ and $50b$, and the output voltage is similar to that shown at A, Fig. 4, and suitable to feed the differentiating trip circuit of Fig. 2. For this purpose, the terminals 63b and 50b of Fig. 3 would be connected respectively to the terminals 64 and 65 of Fig. 2.

The term kinetic energy as used herein refers generally to the movement of a mass, and the term solenoid as used herein refers generally to a coil or other device, regardless of its shape, having an associated electrical or magnetic field which may be disturbed by a projectile or other object.

Other variations and modifications may be made within the scope of the invention and portions of the improvements may be used without others.

Having thus described the invention what is claimed as new is:

1. In a flight detecting device having means responsive to the presence of a travelling object as it passes a given point for producing a varying unidirectional electrical surge having a minimum rate of change at the instant the object is at said point, means for producing from said surge another electrical surge which begins at the instant the rate of change of the first surge is a minimum and means to utilize the second surge to produce desired indicia.

2. In a flight detecting device having means responsive to the presence of a travelling object as it passes a given point for producing a varying unidirectional electrical surge which has a maximum value at the instant the object is at said point, means for producing from said surge an alternating pulse which passes through zero at the instant the unidirectional surge is a maximum, and which pulse comprises a pair of surges occurring one before and one after said zero value; means for producing from said alternating pulse a final electrical surge which begins at the instant the alternating pulse passes through zero; and indicating means responsive to said final electrical surge.

3. In a flight detecting device, means responsive to the presence of a moving object as it passes a given point for producing a varying unidirectional electrical surge having a minimum rate of change at the instant the object is at said point; means for producing from said surge an alternating pulse which passes through zero at the instant the rate of change of the unidirectional surge is a minimum and which pulse comprises a pair of surges occurring one before and one after said zero value; and means, including an indicator, for producing an indication only in response to the latter surge of said alternating pulse.

4. In a flight detecting device, means responsive to the presence of a moving object as it passes a given point for producing a varying unidirectional electrical surge having a maximum value at the instant the object is at said point; means for producing from said surge a substantially symmetrical alternating pulse which passes through zero at the instant the unidirectional surge is a maximum, and which pulse comprises a pair of surges occurring one before and one after said zero value; means for producing from said alternating pulse a second alternating pulse passing through zero simultaneously with the first, and which second pulse comprises a pair of surges occurring one before and one after said zero value, the latter of which surges has a greater rate of change and is of greater value than the former; means for producing from said latter surge of the second alternating pulse a final electrical surge which begins at the instant the second alternating pulse passes through zero; and indicating means responsive to said final electrical surge.

5. In a flight detecting device, means responsive to the presence of a moving object as it passes a given point for producing a varying unidirectional electrical surge having a minimum rate of change at the instant the object is at said point; means for producing from said surge an alternating pulse which passes through zero at the instant the rate of change of the unidirectional surge is a minimum, and which pulse comprises a pair of surges occurring one before and one after said zero value, the latter of which surges has a greater rate of change and is of greater value than the former; and means, including an indicator, for producing an indication only in response to the latter of said pair of surges.

6. In a flight detecting device, means responsive to the presence of a travelling object as it passes a given point for producing a varying unidirectional electrical surge having a minimum rate of change at the instant the object is at said point; means for producing from said surge an alternating pulse which passes through zero at the instant the rate of change of the unidirectional surge is a minimum, and which pulse comprises a pair of surges occurring one before and one after said zero value, the latter of which surges has a greater rate of change and is of greater value than the former; means for producing from said latter surge a final electrical impulse which begins at the instant the alternating pulse passes through zero; and indicating means responsive to said final impulse.

7. The invention as defined in claim 5 in which the means responsive to the presence of the travelling object includes a coil, and an oscillator and amplifier circuit associated with the coil, in which the means for producing an alternating pulse includes a condenser and resistor connected with said amplifier circuit, and a vacuum tube circuit connected with said condenser and a resistor, and in which the means for producing an indication includes a second vacuum tube circuit connected to the output of the first circuit, and operating the indicator.

8. In a device for detecting the passage of a travelling object past a given point, a coil through which the object can pass; an oscillating circuit coupled to the coil for energizing the latter to produce a magnetic field; means for exciting said oscillating circuit; means coupled to the oscillating circuit for providing a unidirectional electrical surge in response to a fluctuation in the normal oscillating current of the circuit due to a disturbance of the field of the coil by passage of the travelling object therethrough, said surge having a maximum value at the instant the object is at said given point; and means for producing an indication from said surge practically at the instant the latter is a maximum.

9. In a detecting and indicating device means responsive to the presence of an object at a given point for initiating a varying unidirectional electrical surge having a maximum value at the instant the object is at said point; means for producing from said surge an alternating pulse which passes through zero at the instant the unidirectional surge is a maximum, and which pulse comprises a pair of surges occurring one before and one after said zero value; means for producing from said alternating pulse a final electrical surge which begins at the instant the alternating pulse passes through zero; and indicating means responsive to said final electrical surge.

10. In an electroresponsive device, current conducting means, for receiving a varying unidirectional electrical surge; means connected to said conducting means for producing an alternating electrical pulse when the varying unidirectional electrical surge is impressed on said conducting means, the pulse passing through zero at the instant the varying surge has a maximum value, and said pulse comprising a pair of surges occurring one before and one after said zero value; and means for producing from said alternating pulse a final electrical surge which begins at the instant the pulse passes through zero.

11. In a flight detecting device, a coil through which a travelling object can pass; an oscillating circuit including means to excite the same, said oscillating circuit being coupled to the coil for energizing the latter to produce a magnetic field; means coupled to the oscillating circuit for providing a voltage in response to a fluctuation in the normal oscillating current of the circuit due to a disturbance of the field of the coil by passage of an object therethrough; and means for producing indications from said voltage.

12. In a flight detecting device, a coil for creating a magnetic field into which a traveling object can pass; an oscillating circuit including means to excite the same, said oscillating circuit being coupled to the coil for energizing the latter to produce a magnetic field; and means coupled to the oscillating circuit for providing a voltage in response to a fluctuation in the normal oscillating current of the circuit due to a disturbance of the field of the coil by the presence of an object at a certain point in the magnetic field.

COLIN IRVING BRADFORD.